(No Model.)

J. HERRON & R. T. WRAY.
COKE OVEN DOOR AND FRAME THEREFOR.

No. 287,285. Patented Oct. 23, 1883.

Witnesses:
Samuel Paw,
W. M. Rodkey

Inventor:
Jno. Herron
R. T. Wray

N. PETERS, Photo-Lithographer, Washington, D. C.

United States Patent Office.

JOHN HERRON AND ROBERT T. WRAY, OF DUNBAR, PENNSYLVANIA.

COKE-OVEN DOOR AND FRAME THEREFOR.

SPECIFICATION forming part of Letters Patent No. 287,285, dated October 23, 1883.

Application filed August 4, 1883. (No model.)

*To all whom it may concern:*

Be it known that we, JOHN HERRON and ROBERT T. WRAY, of Dunbar, in the county of Fayette and State of Pennsylvania, have invented certain new and useful Improvements in Doors and Frames for Coke-Ovens; and we do hereby declare that the following is a full, clear, and exact description of the invention, which will enable others skilled in the art to which it appertains to make and use the same, reference being had to the accompanying drawings, which form a part of this specification, and in which—

Figure 1:
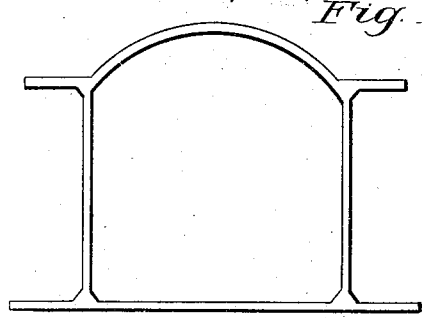
Figure 2:
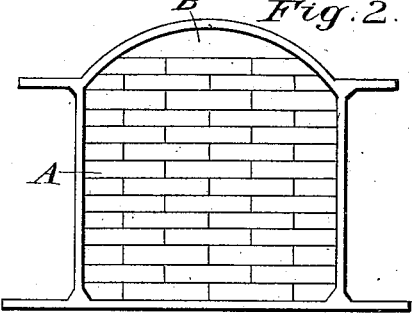
Figure 3:
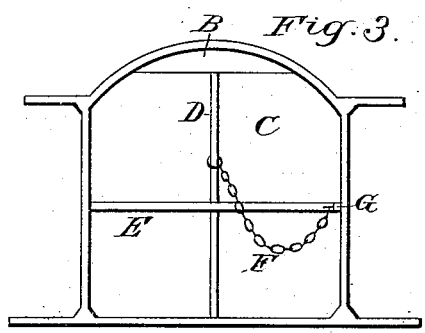
Figure 4:
Figure 5:
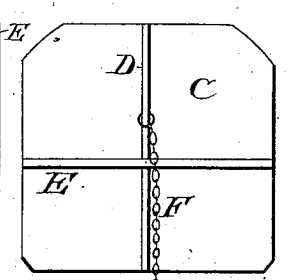
Figure 6:
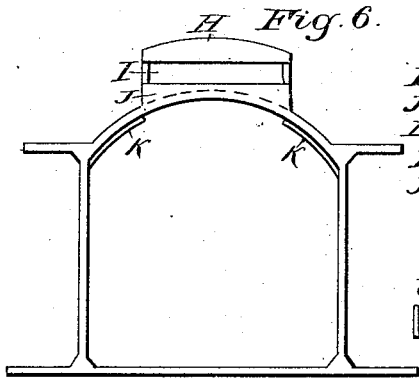
Figure 7:
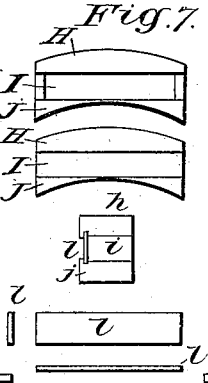
Figure 8:
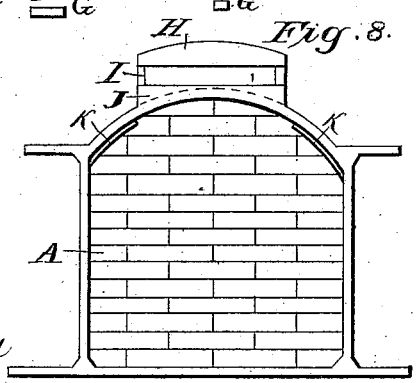
Figure 9:
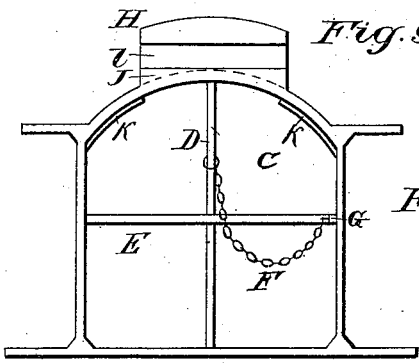
Figure 10:
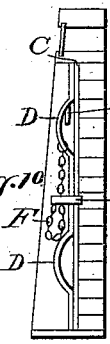
Figure 11:
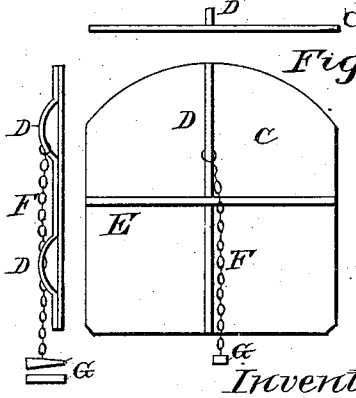

Figure 1 represents an old form of door-frame. Fig. 2 represents the same frame with brick. Fig. 3 represents a frame with a removable iron plate. Fig. 4 represents a side view of matter shown in Figs. 2 and 3. Fig. 5 represents edge and front view of iron plate. Fig. 6 represents an improved door-frame with an air-inlet. Fig. 7 represents front view of air-inlet separate from frame. Fig. 8 represents an improved door-frame with brick. Fig. 9 represents an improved door-frame with a removable iron plate. Fig. 10 represents a side view of matter shown in Figs. 8 and 9. Fig. 11 represents front view of iron plate.

Similar letters of reference indicate corresponding parts in all the figures.

Our improvement in doors and frames has relation to ovens or furnaces for expelling gas from coal, leaving the coke or carbonaceous portion, having for its object to so construct and arrange the door that it can be easily managed, shall be absolutely fire-proof, and that it can be set aside entirely out of the way of leveling the charge of coal or drawing coke.

In the annexed drawings, the letter A represents the brick, which are made of fire-clay.

The letter B represents an inlet, through which air passes into oven at the top of iron plate and underneath arch of door-frame.

The letter C represents the iron plate, which, in combination with the fire-brick, makes the door.

The letter D represents the handle or handhold, which is fastened on iron plate with rivets, and when thus fastened helps to strengthen the plate.

The letter E represents a cross-bar, which is riveted on outside of iron plate for the purpose of strengthening it.

The letter F represents a chain, to which is attached an iron wedge, (represented by the letter G,) and is to be placed at the end of the cross-bar E, for the purpose of holding plate in door-frame and against the brick, thus preventing all air from penetrating oven only at inlet, where it is needed.

The letter H represents top arch of air-inlet.

The letter I represents the opening through which air passes into oven.

The letter J represents the solid frame underneath air-inlet.

The letter K represents the cast ribs underneath arch of door-frame, as shown in Figs. 6, 8, and 9, and is for the purpose of holding iron plate firmly against the brick at top or upper part of door-frame.

The letter $l$ represents a slide-door for the purpose of regulating or shutting air out of oven as it passes through air-inlet.

What we claim as our invention, and desire to secure by Letters Patent, is—

1. The combination of the door-frame, the inclosed fire-brick A, the movable iron plate C, provided with handle D, cross-bar E, and wedge G, connected to chain F, all substantially as described.

2. The door-frame provided with refractory brick filling and an air-inlet, I, above the arch or upper bar, substantially as set forth.

3. The door-frame adapted to receive refractory brick, and provided with ribs K, in combination with holding-plate C, substantially as specified.

In testimony that we claim the foregoing as our own we have hereunto affixed our signatures in presence of two witnesses.

JOHN HERRON.
ROBT. T. WRAY.

Witnesses:
W. N. RODKEY,
SAMUEL TARR.